R. D. THOMSON.
METHOD OF ELECTRIC WELDING.
APPLICATION FILED AUG. 21, 1916.
1,225,373.
Patented May 8, 1917.
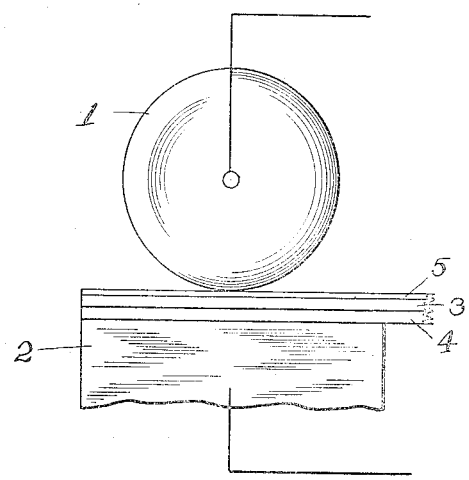
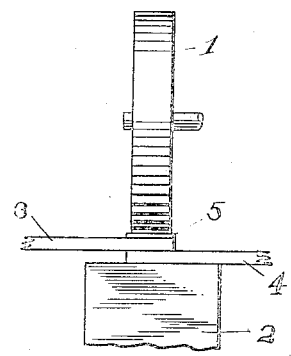
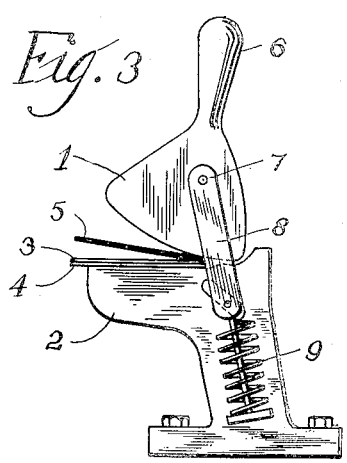
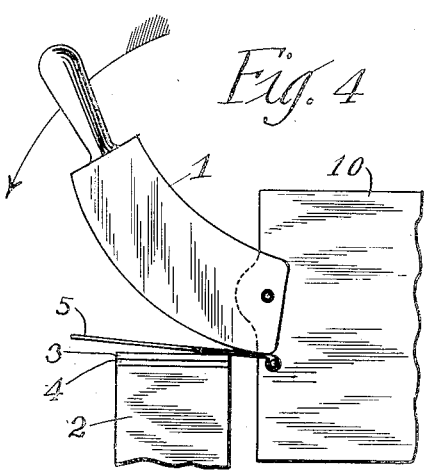
INVENTOR.
Roland Davis Thomson
BY
Townsend & Decker
ATTORNEYS.

UNITED STATES PATENT OFFICE.

ROLAND DAVIS THOMSON, OF SCHENECTADY, NEW YORK, ASSIGNOR TO THOMSON ELECTRIC WELDING COMPANY, OF LYNN, MASSACHUSETTS, A CORPORATION OF MASSACHUSETTS.

METHOD OF ELECTRIC WELDING.

1,225,373.     Specification of Letters Patent.     Patented May 8, 1917.

Application filed August 21, 1916. Serial No. 115,989.

*To all whom it may concern:*

Be it known that I, ROLAND D. THOMSON, a citizen of the United States, and a resident of Schenectady, in the county of Schenectady and State of New York, have invented certain new and useful Improvements in Methods of Electric Welding, of which the following is a specification.

My invention relates to that method of electric welding in which a joint is formed progressively along the desired line of union by pressure applied by means of a rolling or sliding contact.

A well known example of this method or process is found in the welding of plates, sheets or bars by a longitudinal seam formed by pressing the pieces together by means of a current-bearing roller contact and my invention will be described more particularly with reference to that special class of work.

Heretofore great difficulty had been experienced in this process owing to the pitting of the roller or slide which pitting interferes with the certainty of action of the apparatus and makes it necessary to frequently dress the face of the roller or slide.

The aim of my invention is to overcome the difficulty thus experienced in the general process of welding above referred to and to this end the invention consists in interposing between the progressively acting current-bearing electrode and the surface of the work a supplemental strip, plate or sheet of metal which is engaged progressively by the electrode in the operation of making the joint and which in practice avoids the objectionable pitting of the electrode itself. Said supplemental interposed strip, plate or sheet of metal may be replaced as often as required and avoids the necessity of dressing the face of the roller or slide.

In the accompanying drawings Figure 1 shows the application of my invention to welding by a roller contact method and as applied to the formation of a lap joint between two sheets or plates of metal.

Fig. 2 is an end elevation of the same apparatus.

Fig. 3 shows in side elevation the application of the invention to the case of a rocking contact electrode and Fig. 4 shows a modification in the construction of a rocking contact electrode adapted to carry on my improved process.

Referring to Figs. 1 and 2, 1 indicates the roller contact of an electric welder and 2 the opposite electrode or contact shown here as a fixed block between which electrodes the work to be welded is pressed during the passage of the electric welding current from one electrode to the other and through the work. The pieces to be welded are indicated in this instance as comprising two plates of metal 3, 4, lapped at their ends or edges and included between the electrodes for the purpose of making a lap joint. In ordinary practice the electrode 1 makes direct contact with the upper of the two pieces 3, 4, and as it passes progressively over the piece 3, forms a welded joint between the two pieces through the application of the welding current and pressure applied by the electrode 1. In this process, as before stated, the welding is uncertain due to the pitting of the roller requiring frequent dressing of the contact bearing face thereof. To overcome this objection I interpose between the electrode 1 and the work during the operation a supplemental conducting strip, plate, sheet or bar of metal 5 preferably of copper or other good conducting substance. This plate or sheet may be laid upon the metal pieces preparatory to the welding process or may be fed in upon them during the operation so as to be progressively engaged by the electrode 1. The strip is made of such shape in cross-section as to conform to the surface of the piece 3 engaged thereby and to the contact surface of the electrode 1. In the present instance the strip 5 is flat inasmuch as the surfaces engaging the same are flat.

In the apparatus shown in Fig. 3 the contact electrode is a rocking contact electrode having an operating handle 6 and pivoted at 7 to a link 8 connected at its lower end with a spring 9 which assists in the application of the pressure by electrode 1 during the rocking movement by means of the handle 6. The interposed sheet or piece of copper 5 gives a clean contact and prevents the sliding or rocking contact from pitting.

In Fig. 4 the electrode 1 is pivoted to a weight 10 which assists in giving the desired pressure when the electrode 1 is rocked by the handle. In this instance the interposed strip or piece 5 is pivoted or attached to the weight or other part and is brought down into progressive contact with the work as its upper surface is progressively engaged by the working contact and pressure applied to the face of the electrode 1.

What I claim as my invention is:—

1. The herein described improvement in making a joint progressively along the line of desired union by the electric welding process, consisting in interposing a supplemental piece of good conducting material between the work and the electrode and adapted to be engaged by the electrode progressively as it passes over the work.

2. The herein described improvement in forming a joint progressively by the use of a rolling contact electrode applying welding current and pressure to the work, consisting in interposing between said electrode and the work a piece of good conducting material adapted to be progressively engaged by the contact surface of said electrode as and for the purpose described.

3. In an electric welding apparatus for forming a seam or line of welding progressively by the electric welding process, the combination with a rocking electrode having an operating handle, of supplemental means for assisting in holding the roller contact electrode against the work.

4. In an electric welding apparatus for forming an electric line or seam weld progressively, the combination of a rocking electrode and a supplemental contact piece adapted to be engaged progressively by the contact surface of the electrode as it is applied to the work in the formation of the line of weld, said supplemental piece being interposed between said electrode and the work.

Signed at Schenectady, in the county of Schenectady and State of New York, this third day of August, A. D. 1916.

ROLAND DAVIS THOMSON.

Witnesses:
F. M. HOBEN,
H. R. LEONARD.